July 11, 1939.   M. S. HOUSER   2,165,705
FLOW METER
Filed Aug. 4, 1937
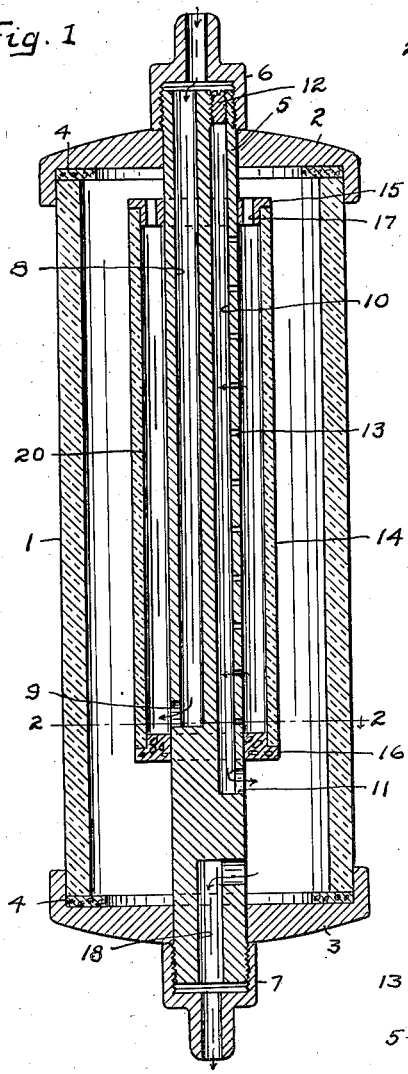
Fig. 1
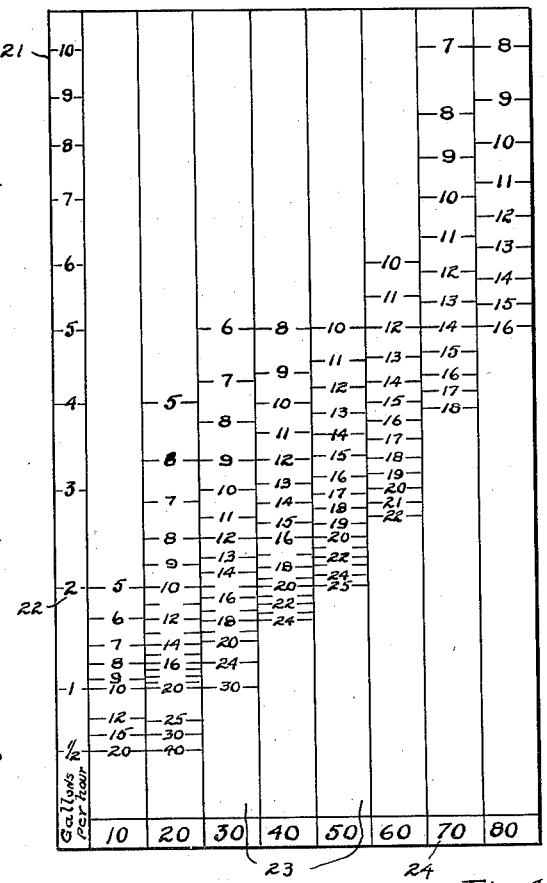
Fig. 4.
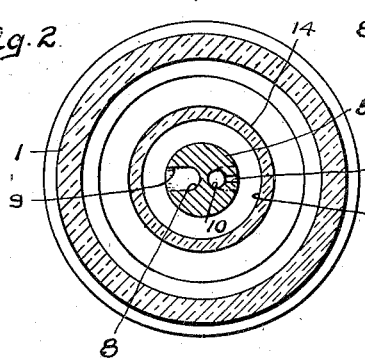
Fig. 2
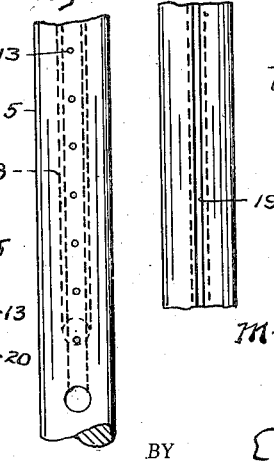
Fig. 3.
Fig. 5.
Miles S. Houser
INVENTOR.
BY  Elwin M. Hulse
ATTORNEY.

Patented July 11, 1939

2,165,705

UNITED STATES PATENT OFFICE 2,165,705

FLOW METER

Miles S. Houser, Bluffton, Ind.

Application August 4, 1937, Serial No. 157,375

1 Claim. (Cl. 73—215)

The invention relates to flow meters for measuring quantities of liquid, such as gasoline.

The object of the invention is to provide a simple device that will accurately measure the quantity of flow of a liquid under pressure.

Another object is to provide a simple meter that will accurately measure the amount of gasoline consumed by a motor driven vehicle at all speeds, irrespective of pulsations in the pump that supplies the fuel to the motor and which offers little or no resistance to the flow of the fuel.

The invention consists of the novel construction and arrangement of parts hereinafter described and illustrated in the accompanying drawing in which Figure 1 is a vertical cross-section of a device embodying the invention.

Fig. 2 is a cross-section on line 2—2 of Fig. 1.

Fig. 3 is a fractional view of the conduit member.

Fig. 4 is a view of the inner cylinder rolled out to show the graduations thereon, and Fig. 5 is a fractional view of a modified form of the conduit member.

Referring to the illustrative drawing the outer cylinder 1 is preferably formed of transparent material, such as glass, and its opposite ends are closed by the caps 2, 3, with the gaskets 4 between the caps and the cylinder. A conduit-carrying member 5 projects at its opposite ends through the caps respectively, and the projecting ends are threaded to receive the nipples 6, 7. By tightening the nipples on the member, the nipples engage the caps and clamp them firmly on the cylinder 1, thus forming a compact unit and sealing the caps on the cylinder.

A vertical channel or conduit 8 is formed in the member 5 and leads from the upper end thereof to a selected point below, at which point an opening 9 is formed in the member through which liquid, entering at the upper end of the conduit from the nipple 6, will discharge. A second vertical channel or conduit 10 is formed in the member 5 and leads from the upper end of the member to a selected point below, at which point an opening 11 formed in the member 5 communicates with the conduit 10 and the interior of the cylinder 1. The upper end of the conduit 10 is closed by a plug 12, and a series of apertures 13 is formed in the member 5, each aperture forming a communication between the conduit 10 and the exterior of the member.

A second transparent cylinder 14 is suitably mounted on the member 5, as by the cork gaskets 15, 16 which seal the opposite ends of the cylinder. Suitable vents 17 are formed in the upper gasket. This cylinder is installed on the member 5 with its lower end above the discharge opening 11 and below the opening 9 so that the liquid entering the conduit 8 through the nipple 6 will discharge through the opening 9 into the cylinder 14 and pass through the apertures 13 into the conduit 10 and flow from said conduit through the opening 11 into the cylinder 1.

A third channel or conduit 18 is formed in the member 5 and extends from the lower end of the member to a selected point below the discharge opening 11 at which point the conduit communicates with the interior of the cylinder. The liquid that passes into the cylinder from the conduit 10 discharges through the conduit 18 and the nipple 7.

Instead of the apertures 13 in the member 5, I may substitute a slot 19, Fig. 5, of suitable width that will communicate with the conduit 10.

In practice, the nipples 6, 7 will be connected to the fuel supply line between the pump and the carburetor so that all the fuel delivered by the pump will pass through the meter. The fuel enters through the nipple 6 and flows down the conduit 8 and discharges into the chamber 20 formed by the cylinder 14. The level of the liquid rises in this chamber until it overflows through the lowest aperture, 13 into the conduit 10. The level of the liquid will rise in the chamber 20 in accordance with the amount of liquid supplied to the carburetor, and more and more of the liquid will pass into the conduit as more of the apertures are reached by that level until the maximum demand of the motor is reached. The level of the liquid in the chamber 20 is read on the scale 21 that is suitably formed or mounted on the cylinder 14.

As shown in Fig. 4, a series of vertical columns of graduations 22, 23 is provided. The column 22 represents gallons per hour and each of the columns 23 represents miles per gallon. The horizontal row of figures 24 represents the speedometer readings. The level of the liquid in the chamber 20 for any speed of the vehicle may be read on the scale 23 above the indicia 24, representing that speed and the miles per gallon of fuel noted, and at the same time the scale 22 will indicate the rate per hour of fuel passing through the meter.

Since the cylinder 1 is sealed at both ends and the sealed cylinder 14 is vented at its upper end the pressure in the two cylinders is balanced at all times. No pressure is consumed in operating the meter and practically no resistance is offered to the flow of the liquid. Hence the pressure on the liquid remains the same while it is passing through the meter, making the device especially efficient on very low pressures where the liquid has a constant viscosity. A considerable variation in the pressure of the fuel in the feed line of the vehicle does not affect the reading provided that the pressure in the line is greater than atmospheric pressure.

In use on a motor vehicle the pulsation of the fuel pump does not affect the reading on the scale since the volume of liquid in the indicating chamber does not noticeably fluctuate.

The meter may be used for various purposes, the graduations on the scale being arranged to meet the requirements of the use, hence its application to a motor vehicle is but one of such uses.

What I claim is:

A flow meter comprising two transparent vertical cylinders one within the other, a carrier extending axially through both cylinders, means mounted on the carrier to close the opposite ends of the outer cylinder, channeled members revolubly mounted on the carrier and adapted to clamp the closure means on the outer cylinder, means to close the opposite ends of the inner cylinder, the upper one of said latter closures having vents therein, an inlet conduit in the carrier communicating with the lower portion of the inner cylinder and with the upper one of the channeled members, a second conduit in the carrier having communication with both cylinders and through which liquid flowing into the inner cylinder, overflows at a plurality of levels into the outer cylinder and discharges through the other channeled member and graduations on one of the cylinders to cooperate with various levels of liquid in the inner cylinder for indicatng quantities of liquid flowing through the meter.

MILES S. HOUSER.